Oct. 29, 1929.     A. SHIREMAN     1,733,562
SEEDER
Filed Nov. 19, 1927
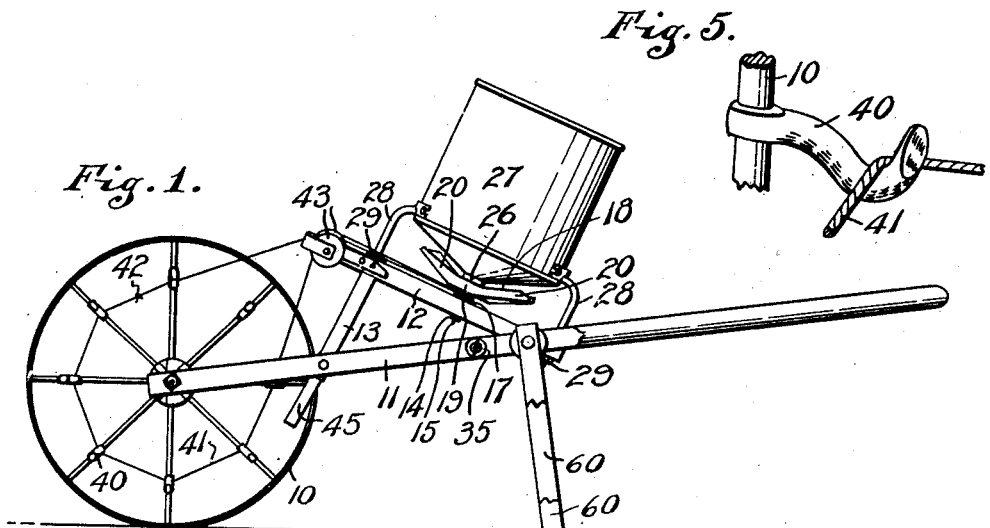
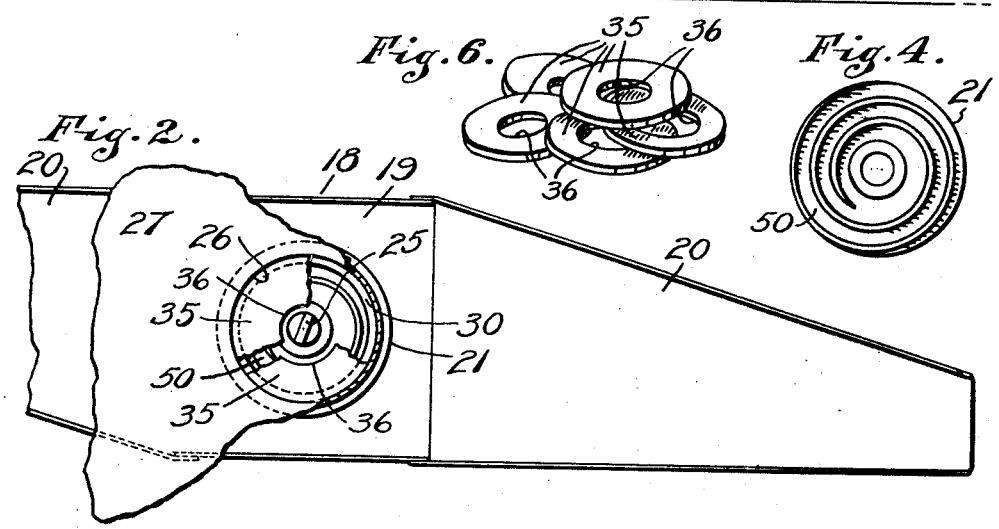
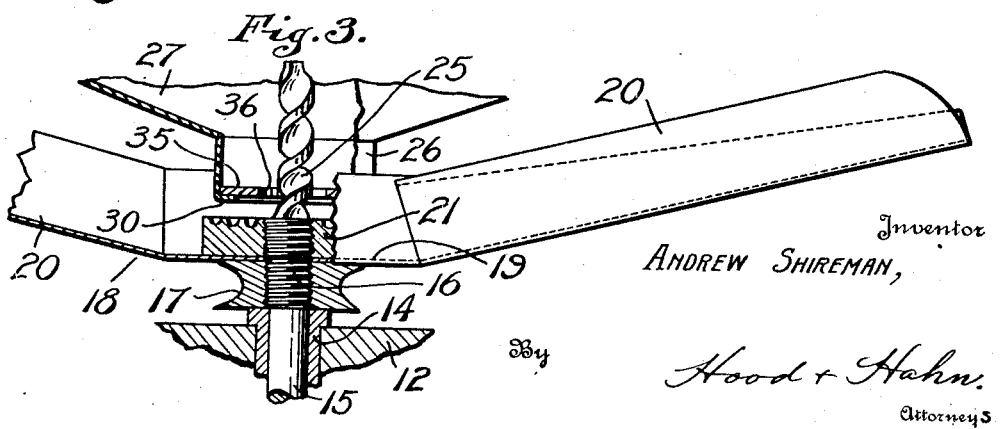
Inventor
ANDREW SHIREMAN,
By Hood & Hahn.
Attorneys Patented Oct. 29, 1929

1,733,562

UNITED STATES PATENT OFFICE

ANDREW SHIREMAN, OF MARTINSVILLE, INDIANA; ELLA J. SHIREMAN ADMINISTRATRIX OF SAID ANDREW SHIREMAN, DECEASED

SEEDER

Application filed November 19, 1927. Serial No. 234,327.

The object of my invention is to produce a hand operated broad-cast seeder by means of which seeding of ground with small seeds may be accurately and uniformly accomplished.

The accompanying drawings illustrate my invention.

Fig. 1, is a side elevation of the apparatus at rest, Fig. 2, a fragmentary horizontal section just above the lower end of the seed hopper, showing the throwing element in fragmentary plan, Fig. 3, a fragmentary vertical section of the parts shown in Fig. 2, Fig. 4, a plan of a desirable form of seed receiving platform, Fig. 5, a fragmentary perspective of a portion of the traction wheel and Fig. 6, a plan of a nest of gauge eyes.

In the drawings 10 indicates the traction wheel upon the axle of which is supported the forward ends of a main frame comprising a pair of side bars 11 the rear end of which form barrow handles to be grasped by the operator. Secured to the main frame, in such position as to be substantially horizontal when the frame 11 is held by the operator is a central bar 12 supported at its forward end by a strut 13.

Mounted in bar 12 is a metal bushing 14 in which is journalled the lower end of a stem 15 threaded at 16 to receive a driving pulley 17. Resting upon pully 17 is a throwing arm 18 which is trough shaped with a central portion 19 and oppositely extending trough arms 20. The throwing arm 18 is held in place by a seed receiving platform 21 threaded upon threads 16 and clamping the throwing arm upon pulley 17, said platform being arranged centrally of the portion 19 of the throwing arm. The upper end of stem 15 is twisted to form a seed stirring element 25.

Supported centrally above the seed receiving platform 21 is the lower tubular end 26 of the seed hopper 27 which is supported upon bar 12 by relatively small-diameter standards 28 the lower ends of which are vertical and pass through bar 12. These lower ends are threaded to receive clamping nuts 29 which serve to hold the hopper in proper position and permit slight vertical adjustment thereof so that the lower end of the tubular portion 26 may be accurately adjusted relative to the upper surface of the platform 21.

The above described adjustment of the gauge eye relative to the upper surface of the platform is provided in order that, no matter what size of seed is to be sown, the gauge eye may be properly vertically positioned above the platform according to the size of the seed which is to be shown, the arrangement being such that while there may be a free flow of seed from the eye onto the platform when the platform is being rotated and the seed progressively thrown therefrom yet, nevertheless, when the platform is stationary the pile of seed issued from the gauge eye and resting upon the platform will have a base of smaller diameter than the platform so that no surplus of grain can accumulate beyond the platform.

The lower end of the tubular portion 26 is provided with a narrow inturned flange 30 upon which may rest any one of a series of gauge eyes 35 the central openings 36 of which are of different diameters such as to accurately determine the amount of seed which may flow therethrough in a given time depending upon the speed of rotation of platform 21.

The traction wheel is provided at one side with a circumferential series of angularly spaced hooks 40 adapted to receive, and form a driving pulley for, a driving cord 41 the ends of which may be knotted as indicated at 42. Cord 41 is passed over a pair of idlers 43 supported on bar 12, and around pulley 17.

By this arrangement I have found it possible to use an ordinary small braided cotton cord as a belt. Because of the angular spacing of the hooks 40 the knot does not interfere with proper driving operation of the cord and there can be no gathering of mud in the hooks 40, interfering with proper operation of the belt, as would be the case with a continuous-groove pulley. A scraper 45 is supported on the main frame in position to scrape away mud which will at times gather on the rim of wheel 10.

The platform 21 is so spaced from flange 30 as to form a proper exit passage for the seed but to prevent a free running of the seed from the hopper when the throwing wheel is stationary and, in order to insure against a free running of the seed from the hopper when the structure is at rest as indicated in Fig. 1, I have found it desirable to groove the upper face of platform 21 preferably by a shallow multi-turned volute groove 50, the pitch of which is comparatively slight and preferably rounded, in cross section, as shown.

In operation a gauge eye 35 having an opening 36 of the proper size will be selected for the particular seed which is to be broadcasted and the amount of that seed which is to be distributed over a given area. I have found by many experiments that, in order to insure a uniform broadcasting of the seed throughout 360 degrees of throw, it is essential that the seed be delivered to the throwing element in an annular stream concentric with the throwing wheel because otherwise the amount of seed thrown in certain portions of the arc will be greater than other portions. I have also found that it is not practicably possible, by means of adjustable shutters, to accurately predetermine the amount of seed which will be thrown for a given travel over the ground. It is for this reason that, in my apparatus, the flow of seed from the hopper to the throwing element is determined by a desired one of a series of gauge eyes as shown and that by such means it is possible, in the use of my apparatus, for an operator, knowing the amount of seed which he desires to distribute over a specified acreage, to easily select that one of the gauge eyes which will so control the flow of seed to the throwing element that the entire quantity of seed will be equally distributed over the entire acreage, the seed flow value of the gauge eyes having been previously determined by the manufacturer.

It will be noted that the gauge eyes may be readily extracted upwardly from the tubular portion 26 of hopper 27 and that, because the lower end of the seed hopper should be accurately spaced from the throwing table, it is not practicable to introduce any one of a series of gauge eyes except from above.

The position of the lower end of the hopper relative to the throwing wheel may be accurately determined and adjusted by means of the nuts 29.

It might be thought, at first glance, that, because of the volute groove 50, there would be a substantial lopsided delivery of seed to the throwing element at the end of the volute groove but this is not the case. Observation of the apparatus in use demonstrates the fact that the major portion of the seed is thrown off from the top of the platform in a horizontal spray which is substantially uniform throughout the 360 degrees and that concentric grooves, or even a flat upper surface of the table will give substantially the same results, so far as seed distribution is concerned. I have found, however, that the grooved upper surface of the platform will prevent any substantial quantity of seed flowing from the hopper when the apparatus is in the at rest position shown in Fig. 1 where, if it were not for the grooved surface there would be a tendency for very small seeds to flow almost continuously from the hopper into the throwing element when the parts are at rest, because of the unavoidable inclination of the platform. Where a volute groove, as shown in Fig. 4, is used, a reverse rotation of the throwing element will result in a slight decrease of seed throwing but it is not possible to notice any substantial variation in the evenness with which the seed is broadcasted owing to the fact that a very large percentage of the total seed is thrown nearly radially evenly from the platform across the top of the groove.

Suitable supporting legs 60 serve to sustain the main frame in position at rest without interfering with travel of the apparatus over the ground.

The element 25 projects upwardly into the hopper and serves as a stirrer to prevent any foreign substance, such as a small twig or piece of a leaf, from clogging the gauge eye and thus insures uniformity of flow of seed when the apparatus is in motion.

I have found in use that the quantity of seed broadcasted over a given area is independent of the speed of movement of wheel 10 across that area and that consequently the number of seeds per square yard will be independent of the speed of travel of the operator.

Because of the use of the angularly separated hooks 40 and the driving cord 41, I have found it very easy to maintain a proper driving tension in the cord, the bends in the cord due to the hooks serving to increase the frictional contact between wheel 10 and the cord, and that whenever the cord gets too loose, it may be readily tightened by cutting and re-knotting without interfering with the proper operation of the apparatus.

I claim as my invention:

1. A broadcasting seeder comprising a rotatable throwing element having a radially projecting trough, a seed receiving platform at the axis of said throwing element and rotatable therewith, a seed hopper having its lower end vertically spaced from but closely adjacent the platform and provided with an inturned flange, a gauge eye of substantially smaller diameter than the platform arranged at the lower end of the hopper axially of the throwing element upon said flange and upwardly removable from the hopper and so spaced from the platform that seed issuing from the gage eye onto the platform may not flow beyond the platform when the platform is at rest, and a stirring element carried by the throwing element and projecting upwardly through the gauge eye into the lower regions of the hopper.

2. A broadcasting seeder comprising a rotatable throwing element having a radially projecting trough, a seed receiving platform at the axis of said throwing element and rotatable therewith, a seed hopper having its lower end vertically spaced from but closely adjacent the platform, a gauge eye of substantially smaller diameter than the platform arranged at the lower end of the hopper axially of the throwing element and upwardly removable from the hopper and so spaced from the platform that seed issuing from the gage eye onto the platform may not flow beyond the platform when the platform is at rest, and a stirring element carried by the throwing element and projected upwardly through the gauge eye into the lower regions of the hopper.

3. A broadcasting seeder comprising a rotatable throwing element having a radially projecting trough, a seed receiving platform at the axis of said throwing element and rotatable therewith, a seed hopper having its lower end vertically spaced from but closely adjacent the platform and provided with an inturned flange, a thin gauge eye of substantially smaller diameter than the platform arranged at the lower end of the hopper axially of the throwing element upon said flange, and a stirring element carried by the throwing element and projected upwardly through the gauge eye into the lower regions of the hopper.

4. A broadcasting seeder comprising a rotatable throwing element having a radially projecting trough, a seed receiving platform at the axis of said throwing element and rotatable therewith, a seed hopper having its lower end vertically spaced from but closely adjacent the platform and provided with an inturned flange, a thin gauge eye of substantially smaller diameter than the platform arranged at the lower end of the hopper axially of the throwing element upon said flange and upwardly removable from the hopper.

5. A broadcasting seeder comprising a rotatable throwing element having a radially projecting trough, a seed receiving platform at the axis of said throwing element and rotatable therewith, a seed hopper having its lower end vertically spaced from but closely adjacent the platform, and a thin gauge eye of substantially smaller diameter than the platform arranged at the lower end of the hopper axially of the throwing element.

6. In a broadcasting seeder the combination of a rotatable throwing element having a radially projected throwing arm, a seed receiving platform arranged at the axis of the throwing element and having a grooved upper face and rotatable with the throwing element, a seed hopper having its lower end vertically spaced from but closely adjacent the platform, and means for supporting a thin gauge eye of predetermined size at the lower end of the hopper coaxially with the throwing element, said gage eye being of substantially less diameter than the platform.

7. In a broadcasting seeder the combination of a rotatable throwing element having a radially projecting throwing arm, a seed receiving platform arranged at the axis of the throwing element and having a grooved upper face and rotatable with the throwing element, a seed hopper having its lower end vertically spaced from but closely adjacent the platform, and upwardly removable means forming a gauge eye of predetermined size at the lower end of the hopper coaxially with the throwing element, said gage eye being of substantially less diameter than the platform.

In witness whereof, I, ANDREW SHIREMAN, have hereunto set my hand at Indianapolis, Indiana, this 17th day of November, A. D. one thousand nine hundred and twenty-seven.

ANDREW SHIREMAN.